US010120540B2

(12) United States Patent
Treskunov et al.

(10) Patent No.: US 10,120,540 B2
(45) Date of Patent: Nov. 6, 2018

(54) VISUAL FEEDBACK FOR USER INTERFACE NAVIGATION ON TELEVISION SYSTEM

(71) Applicant: Samsung Electronics, Co. Ltd., Suwon, Gyeonggi-do (KR)

(72) Inventors: Anton Treskunov, Santa Clara, CA (US); Yuchang Hu, Santa Clara, CA (US); Susan Choi, Belmont, CA (US)

(73) Assignee: Samsung Electronics Co., Ltd., Suwon ( * ) Notice: Subject to any disclaimer, the term of this patent is extended or adjusted under 35 U.S.C. 154(b) by 281 days.

(21) Appl. No.: 14/107,905

(22) Filed: Dec. 16, 2013

(65) Prior Publication Data

US 2014/0282258 A1 Sep. 18, 2014

Related U.S. Application Data

(60) Provisional application No. 61/785,519, filed on Mar. 14, 2013.

(51) Int. Cl.
*G06F 3/0484* (2013.01)
*G06F 3/0481* (2013.01)
*G06F 3/0486* (2013.01)
*G06F 3/0488* (2013.01)

(52) U.S. Cl.
CPC .......... *G06F 3/0484* (2013.01); *G06F 3/0486* (2013.01); *G06F 3/0488* (2013.01); *G06F 3/04817* (2013.01)

(58) Field of Classification Search
CPC ......... G06F 3/0484; G06F 2203/04801; G06F 3/04812
See application file for complete search history.

(56) References Cited

U.S. PATENT DOCUMENTS

| 5,119,079 A | * | 6/1992 | Hube | G03G 15/5016 345/173 |
|---|---|---|---|---|
| 5,565,888 A | * | 10/1996 | Selker | G06F 3/04895 345/157 |
| 5,687,331 A | * | 11/1997 | Volk | G06F 3/04847 348/E7.071 |
| 5,742,779 A | * | 4/1998 | Steele | G06F 3/04817 345/660 |
| 5,801,692 A | * | 9/1998 | Muzio | G06F 3/04895 715/764 |

(Continued)

FOREIGN PATENT DOCUMENTS

KR 1020120121149 A 11/2012

OTHER PUBLICATIONS

Chris Coyer, Moving Highlight, accessible at: http://css-tricks.com/moving-highlight/, Jan. 9, 2011, last accessed Dec. 16, 2013.

*Primary Examiner* — Ajay M Bhatia
*Assistant Examiner* — Phoebe X Pan
(74) *Attorney, Agent, or Firm* — Ruke Wang; Thomas George

(57) ABSTRACT

In one embodiment, an interface navigation system including a display unit and a control unit that is coupled to the display unit is described. The control unit is configured to detect a first movement of an interface navigation control input in a particular direction, and cause a corresponding second movement and a corresponding change in shape of a visual effect displayed on the display unit in response to the first movement in the particular direction.

6 Claims, 13 Drawing Sheets

(56) References Cited

U.S. PATENT DOCUMENTS

| | | | | |
|---|---|---|---|---|
| 5,990,862 A * | 11/1999 | Lewis | G06F 3/038 | 715/858 |
| 6,020,930 A * | 2/2000 | Legrand | H04N 5/4448 | 348/564 |
| 6,025,837 A * | 2/2000 | Matthews, III | H04N 5/44543 | 348/E5.105 |
| 6,111,562 A * | 8/2000 | Downs | G06F 3/0481 | 715/727 |
| 6,177,945 B1 * | 1/2001 | Pleyer | G06F 3/0481 | 345/426 |
| 6,201,540 B1 * | 3/2001 | Gallup | B60K 35/00 | 701/36 |
| 6,317,116 B1 * | 11/2001 | Rosenberg | G05G 9/047 | 345/163 |
| 6,405,371 B1 * | 6/2002 | Oosterhout | H04N 5/44543 | 348/564 |
| 7,631,275 B2 * | 12/2009 | Chicles | H04N 5/44543 | 715/768 |
| 7,870,511 B2 * | 1/2011 | Suzuki | G06F 8/38 | 715/762 |
| 8,082,518 B2 * | 12/2011 | Flake | G06F 3/0481 | 715/785 |
| 8,375,336 B2 * | 2/2013 | Matthews | G06F 3/0488 | 715/863 |
| 8,413,185 B2 * | 4/2013 | Carpenter, Jr. | H04N 5/44543 | 725/38 |
| 8,533,599 B2 * | 9/2013 | Son | G06F 1/1616 | 715/716 |
| 8,667,426 B2 * | 3/2014 | Matsubara | G06F 3/017 | 715/716 |
| 8,762,845 B2 * | 6/2014 | Ulrich | G06F 3/0481 | 715/716 |
| 9,075,514 B1 * | 7/2015 | Karakotsios | G06F 3/04842 | |
| 9,110,579 B2 * | 8/2015 | Miyazaki | G06F 3/0488 | |
| 9,123,084 B2 * | 9/2015 | Brockmann | G06T 9/00 | |
| 9,338,493 B2 * | 5/2016 | Van Os | G10L 15/22 | |
| 2004/0237053 A1 * | 11/2004 | Impas | G06F 3/0481 | 715/856 |
| 2006/0031776 A1 * | 2/2006 | Glein | G06F 3/0481 | 715/779 |
| 2006/0190841 A1 * | 8/2006 | Lee | G06F 3/0482 | 715/810 |
| 2006/0214926 A1 * | 9/2006 | Kolmykov-Zotov | G06F 3/04842 | 345/179 |
| 2008/0104537 A1 * | 5/2008 | Scott | G06F 3/04812 | 715/800 |
| 2008/0278450 A1 * | 11/2008 | Lashina | G06F 3/0488 | 345/173 |
| 2009/0007001 A1 * | 1/2009 | Morin | G06F 3/0237 | 715/773 |
| 2009/0031240 A1 * | 1/2009 | Hildreth | G06F 3/011 | 715/772 |
| 2009/0058801 A1 * | 3/2009 | Bull | G06F 3/0488 | 345/157 |
| 2009/0058821 A1 | 3/2009 | Chaudhri et al. | | |
| 2009/0064022 A1 * | 3/2009 | Sakamoto | G06F 3/048 | 715/767 |
| 2009/0210910 A1 * | 8/2009 | Smith | H04N 5/44543 | 725/56 |
| 2009/0249203 A1 * | 10/2009 | Tsuruta | G06F 3/018 | 715/702 |
| 2010/0107099 A1 * | 4/2010 | Frazier | G06F 3/044 | 715/765 |
| 2010/0107120 A1 * | 4/2010 | Sareen | G06F 3/04845 | 715/821 |
| 2010/0229125 A1 * | 9/2010 | Cha | G06F 3/017 | 715/828 |
| 2010/0332979 A1 * | 12/2010 | Xu | G05B 19/0426 | 715/704 |
| 2011/0018802 A1 * | 1/2011 | Sung | G06F 3/04847 | 345/158 |
| 2011/0109541 A1 * | 5/2011 | Kitagawa | B60K 35/00 | 345/156 |
| 2011/0109544 A1 | 5/2011 | Kitagawa et al. | | |
| 2011/0199318 A1 * | 8/2011 | Fong | G06F 3/0488 | 345/173 |
| 2011/0221776 A1 * | 9/2011 | Shimotani | G06F 3/0421 | 345/647 |
| 2012/0019732 A1 * | 1/2012 | Lee | G06F 17/30274 | 348/732 |
| 2012/0036433 A1 | 2/2012 | Zimmerman et al. | | |
| 2012/0151390 A1 * | 6/2012 | Trotta | G11B 27/34 | 715/764 |
| 2012/0240071 A1 | 9/2012 | Park | | |
| 2013/0002534 A1 * | 1/2013 | Braun | G06F 1/163 | 345/156 |
| 2013/0033525 A1 | 2/2013 | Markiewicz et al. | | |

* cited by examiner

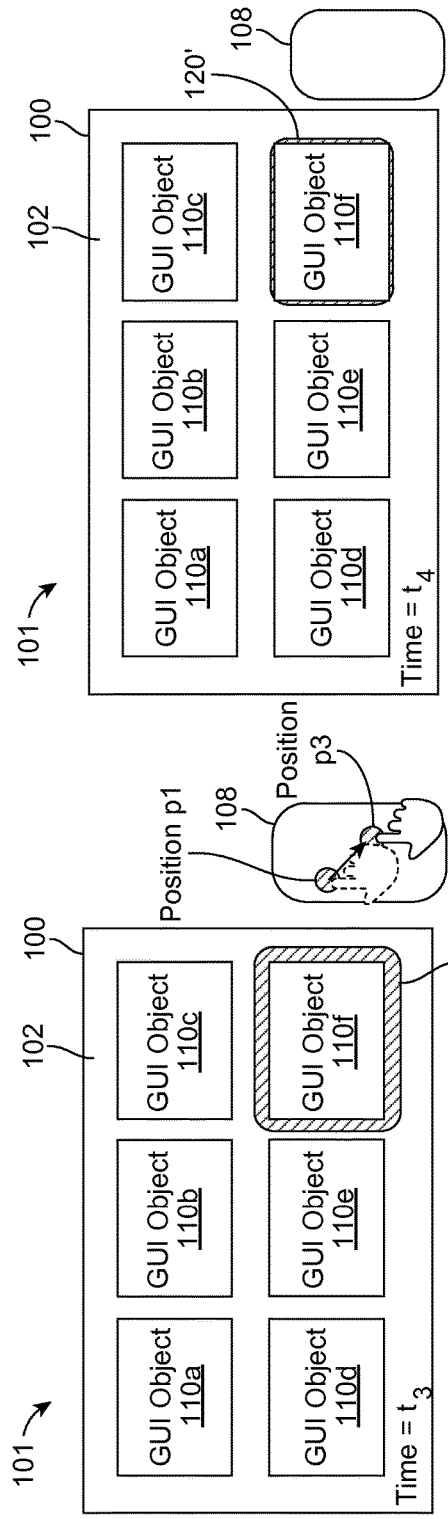
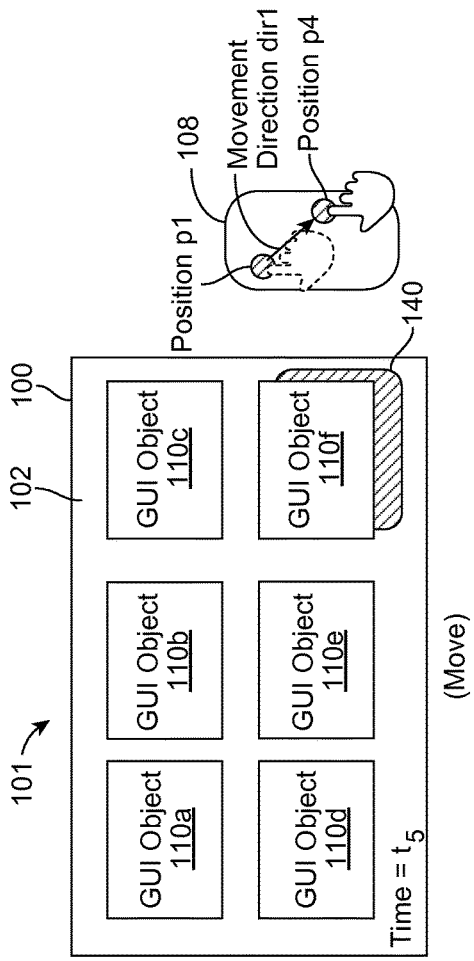

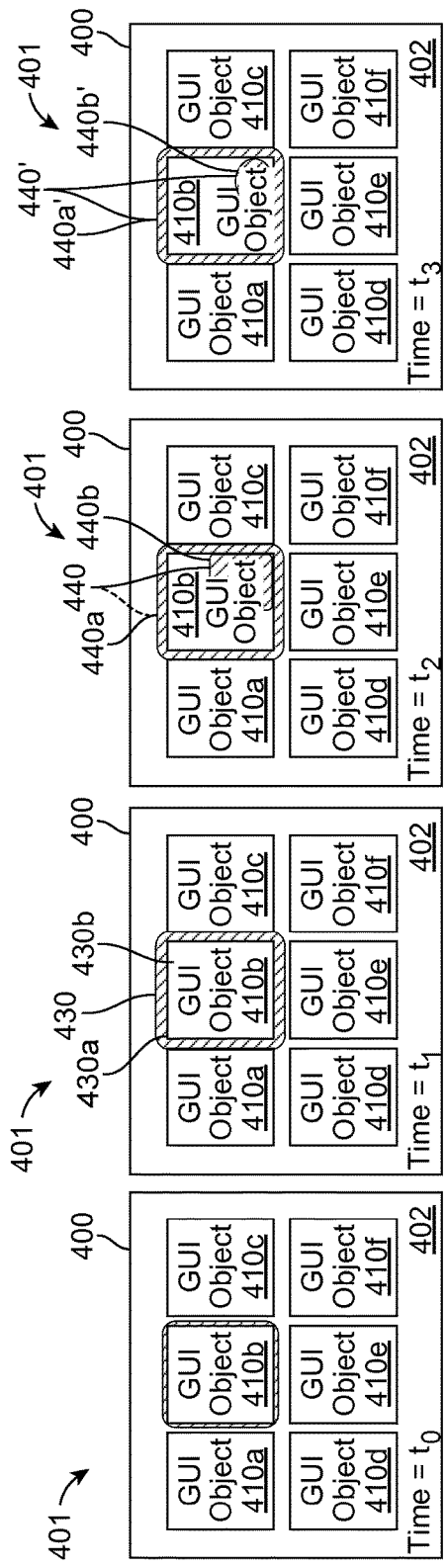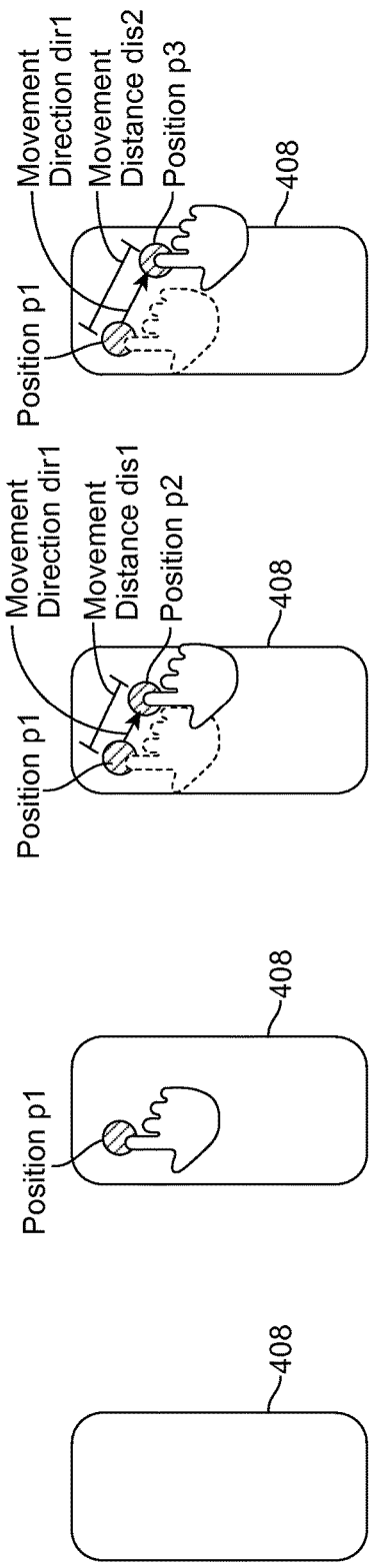
FIG. 4A  FIG. 4B  FIG. 4C  FIG. 4D

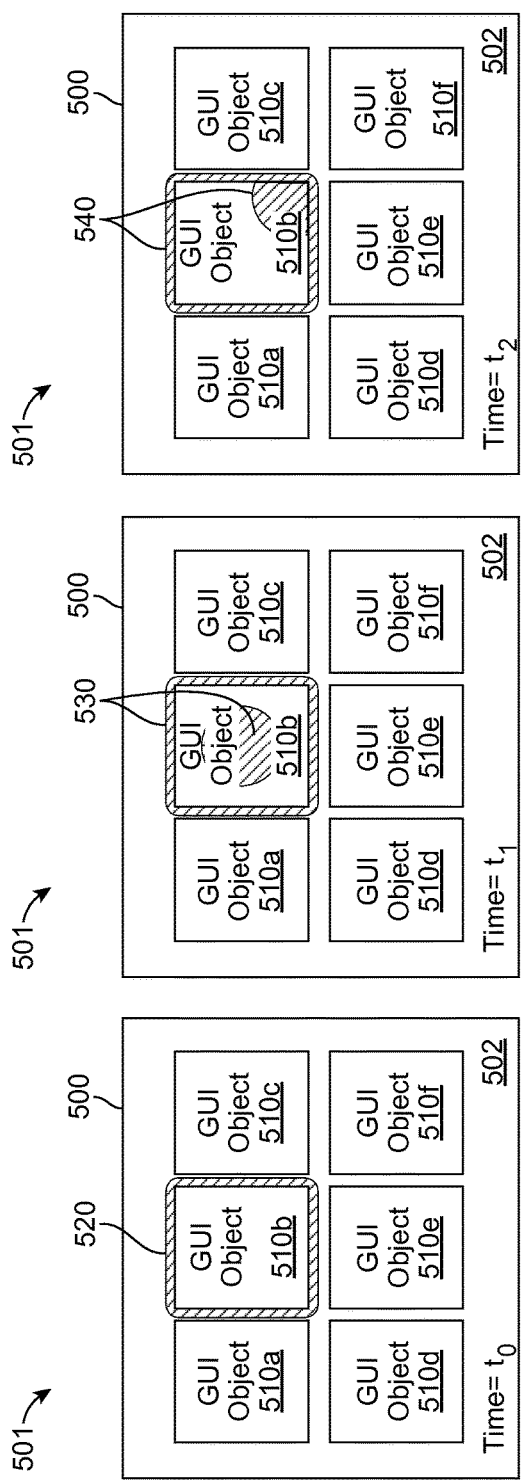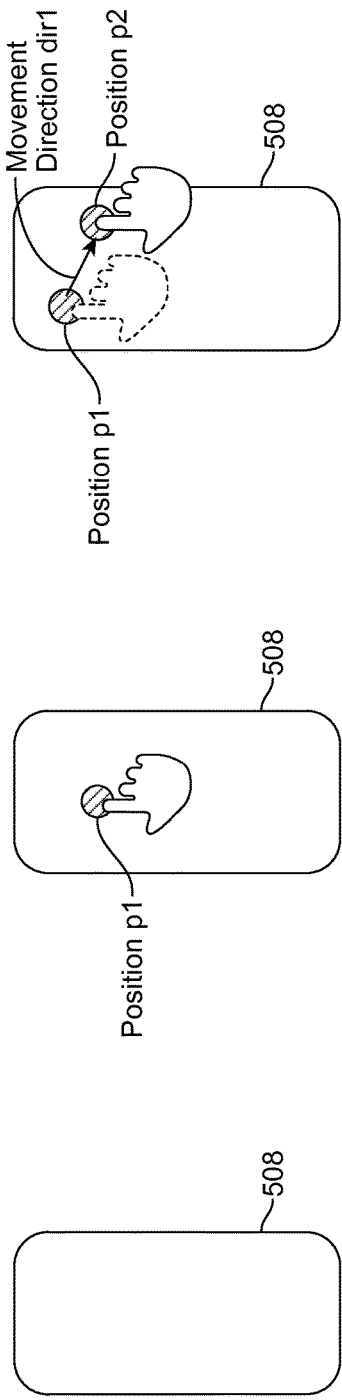
FIG. 5A  FIG. 5B  FIG. 5C

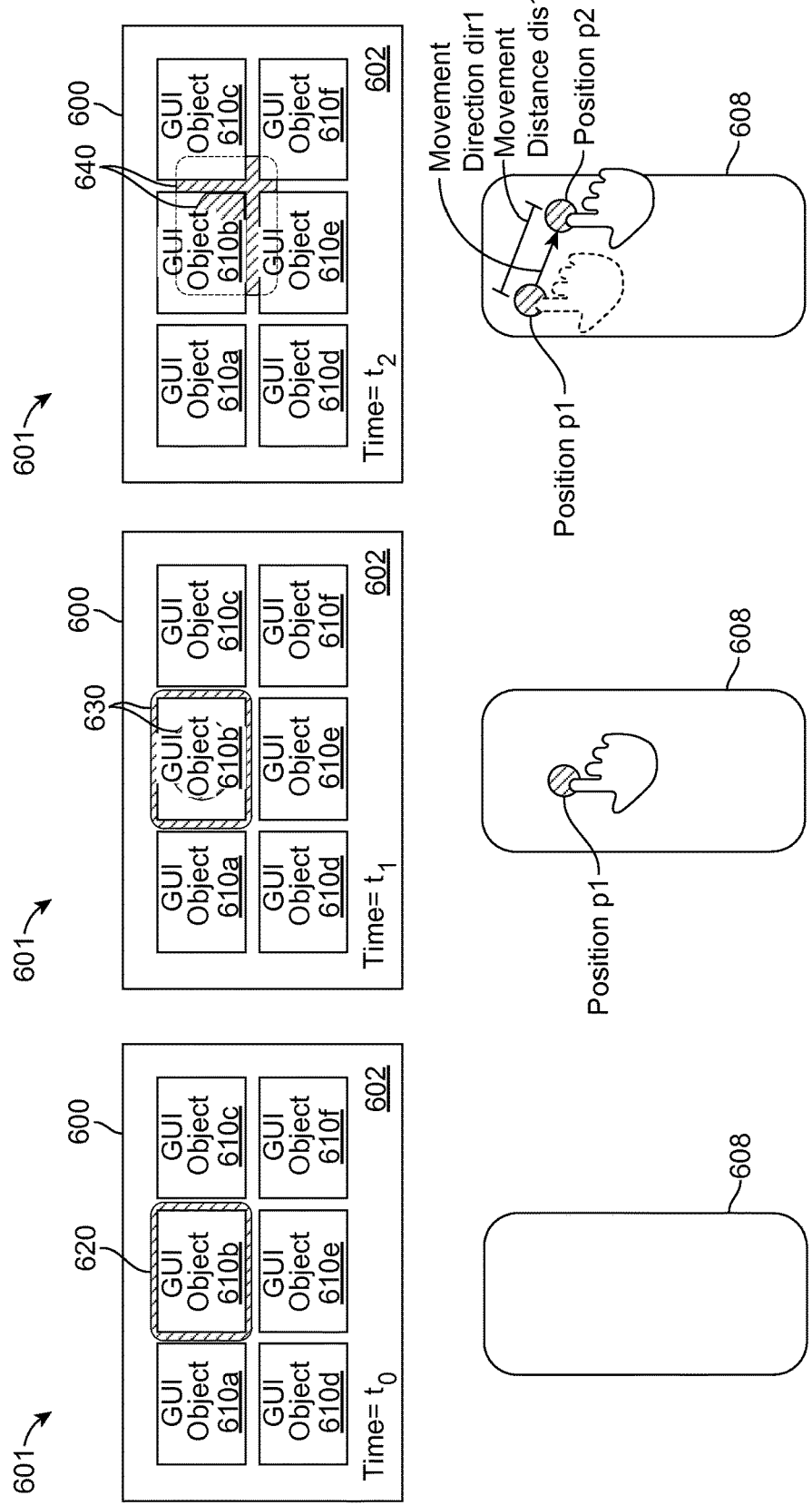

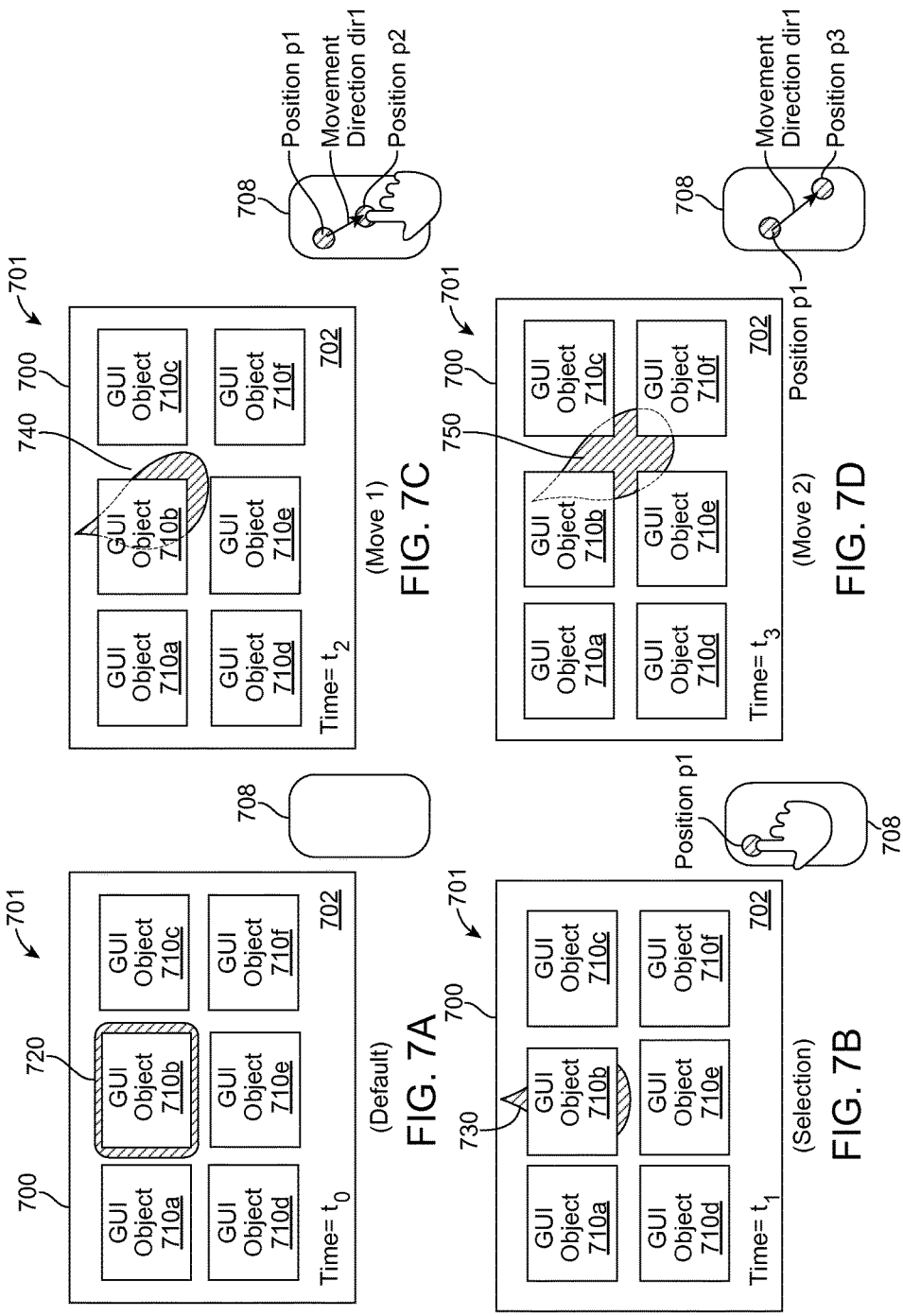

VISUAL FEEDBACK FOR USER INTERFACE NAVIGATION ON TELEVISION SYSTEM

CROSS-REFERENCE TO RELATED APPLICATION(S)

This application claims the benefit, under 35 U.S.C. § 119(e), of U.S. Provisional Patent Application No. 61/785,519 filed Mar. 14, 2013, and the subject matter thereof is incorporated herein by reference thereto.

TECHNICAL FIELD

One or more embodiments relate generally to user interface navigation.

BACKGROUND

Graphical user interface (GUI) is one of the essential components of modern computing systems. Visual effects have been commonly implemented to allow intuitive recognition, to smooth navigability, and to better represent GUI interactions.

When using an input control unit such as a mouse or a touchpad, it is a common practice to highlight selected GUI items or objects to provide necessary focus and interaction feedback that enable users to easily follow through the interface navigation. However, highlighting only the selected GUI items presents a responsive issue since it fails to provide users with immediate feedback of the control movement. Therefore, there is a need to improve navigation visual feedbacks.

SUMMARY

An embodiment of an interface navigation system includes a display unit and a control unit that is coupled to the display unit. The control unit is configured to detect a first movement of an interface navigation control input in a particular direction, and cause a corresponding second movement and a corresponding change in the shape of a visual effect displayed on the display unit in response to the first movement in the particular direction.

The control unit of the interface navigation system is further configured to detect the first movement of the interface navigation control input for a particular distance, and cause the corresponding second movement and the corresponding change in the shape of the visual effect displayed on the display unit in response to the first movement for the particular distance.

The control unit of the interface navigation system is further configured to detect the first movement of the interface navigation control input at a particular speed, and cause the corresponding second movement and the corresponding change in the shape of the visual effect displayed on the display unit in response to the first movement at the particular speed.

The control unit of the interface navigation system is further configured to detect the first movement of the interface navigation control input with a particular force, and cause the corresponding second movement and the corresponding change in the shape of the visual effect displayed on the display unit in response to the first movement with the particular force.

The control unit of the interface navigation system is further configured to detect the first movement of an interface navigation control input in the particular direction, and cause the corresponding second movement and the corresponding change in the strength of the visual effect displayed on the display unit in response to the first movement in the particular direction.

One embodiment of the control unit has a touch sensitive surface, an interface circuit, a processing circuit, and a communication circuit. The touch sensitive surface is configured to detect a first movement of an interface navigation control input. The interface circuit, coupled to the touch sensitive surface, is configured to recognize the first movement of the interface navigation control input in a particular direction. The processing circuit, coupled to the interface circuit, is configured to transfer the recognized direction of the first movement of the interface navigation control input to parameters and/or data, which are transmitted by the communication circuit.

An embodiment of the display unit has a communication circuit, a processing circuit, and a display circuit. The communication circuit is configured to receive parameters and/or data, which are associated with a first movement of an interface navigation control input. The processing circuit, coupled to the communication circuit, configured to extract information of the first movement in a particular direction from received parameters. The display circuit is configured to move a displayed visual effect in the particular direction based on the extracted direction information and to update a shape of the visual effect corresponding to the particular direction.

One embodiment of a method for illustrating a movement of an interface navigation control input includes detecting the movement of the interface navigation control input in a particular direction, determining, using a processor, parameters associated with the movement of the interface navigation control input in the particular direction, and moving and updating a shape of a visual effect according to the movement of the interface navigation control input in the particular direction.

DESCRIPTION OF DRAWINGS

FIGS. 1A-1F illustrate an example embodiment of an interface navigation system, which comprises a display unit and a control unit. It further illustrates how a visual effect is updated based on the direction of a movement of an interface navigation control input.

FIGS. 4A-4D illustrate an example embodiment of how the shape and size of the visual effect update corresponding to the direction of the movement of the interface navigation control input.

FIGS. 5A-5C illustrate an example embodiment of how the inner part of the visual effect updates corresponding to the direction of the movement of the interface navigation control input.

FIGS. 6A-6C illustrate an example embodiment of how both the inner and outer parts of the visual effect update corresponding to the direction of the movement of the interface navigation control input.

FIGS. 7A-7D illustrate another example embodiment of how the visual effect updates based on the direction of the movement of the interface navigation control input.

DETAILED DESCRIPTION

Figure 1A:
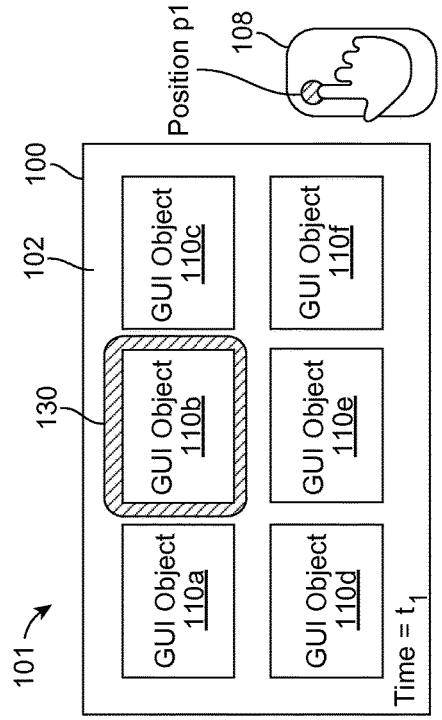

Reference will now be made in detail to some specific embodiments of the present invention. Examples of these specific embodiments are illustrated in the accompanying drawings. While the invention is described in conjunction with such specific embodiments, those skilled in the art will appreciate numerous modifications and variations therefrom. It is intended that the appended claims cover all such alternatives, modifications, variations and equivalents falling within the true spirit and scope of this present invention.

One or more embodiments of the present invention will be described as involving one unit with display function, and the other unit enabling control of the first unit. However, it is to be understood that the concepts described herein are equally applicable to an environment involving multiple display units and multiple control units. It is to be further understood that the control unit can also have display function, and the content displayed on the display unit and the control unit can be related or independent of each other.

The accompanying drawings are intended to help understanding of the units and interoperations among them. The drawings are not to scale. Emphasis has been placed upon illustrating the principles of various embodiments.

FIG. 1A-1F illustrate an embodiment of an interface navigation system 101, which comprises a display unit 100 and a control unit 108. They further illustrate the interactions between the display unit 100 and the control unit 108, and how visual effects displayed on a display area 102 of the display unit 100 is updated based on an interface navigation control input detected by the control unit 108. Hereinafter, the term "display unit" refers to said display unit 100, the term "control unit" refers to said control unit 108, and the term "display area" refers to said display area 102, according to an embodiment of the invention.

According to various embodiments, the display unit may be a Smart TV, a projector screen, a wearable device, a smart mobile device, a computer (e.g., desktop, laptop, server, tablet, netbook, etc.) with a display screen, a media device, a game console, a tablet or any other entities that are capable of displaying a GUI. The display surface of the display unit can be flat or curved. It is to be understood that there are no specific requirements or limitations as to the physical form or material of the display unit.

The display unit may consist of only one entity or it may comprise multiple entities with displaying capacity. The multiple entities can be in different shapes and materials. The display area can be one unified area or it may be divided into multiple sub-areas. The sub-areas may be in various shapes or sizes. For easy illustration, the display unit and the display area are shown as one unified piece in all accompanying drawings.

The display unit can be configured to display one or more GUI objects. For illustrative purposes, a series of identical rectangular GUI Objects 110a-110f are shown within the display area, and are organized to form an overall rectangular area. However, it is to be understood that the GUI objects can be in any size or shape, arranged in any order, and located in any part of the display area, either as a group or independently. The GUI objects can be either actionable or non-actionable. Actionable GUI objects may respond to interface navigation control input changes by triggering one or more actions. For example, actionable GUI objects can be a link to a uniform resource locator (URL) for a web operation to that website, or a widget icon for executing an application or a function associated with the widget icon. Non-actionable objects include but not limited to icons that indicate status or display textual information. The GUI objects include application icons, figures illustrating key strokes of a keyboard, and GUI navigation control indicators such as scroll bars or arrows.

The display unit may be coupled with the control unit. According to various embodiments, the control unit may be a mouse, a scroll bar, a motion control unit, a remote control unit, a control panel, a mobile device, a touchpad or any other devices or components that are capable of detecting a user input. While the accompany drawings present the control unit in a rounded rectangular shape, it is to be understood that various physical shapes (e.g. a wheel, a knob, etc.) can be adopted, including the shape that provides ergonomic features. It is to be further understood that the control unit can be made of various materials.

The control unit may be configured to recognize and accept an interface navigation control input, transform such an input into control data, and communicate the control data to the display unit to cause visual effect updates on the display area. In one embodiment, the control unit detects the interface navigation control input through one or more touch sensitive surfaces. The one or more touch sensitive surfaces enable a user to navigate over the display area with movements of her fingers or other objects on the control unit. For example, a selection of GUI Object 110a can be triggered when the user taps on the touch sensitive surface of the control unit. A user may change the GUI object selection from GUI Object 110a to GUI Object 110f by dragging (maintaining continuous contact of) her finger on the touch sensitive surface in a direction the same as the direction forming a direct path connecting GUI Object 110a to GUI Object 110f. In another embodiment, the control unit detects the interface navigation control input via one or an array of buttons, keys, bars, handles or wheels. In yet another embodiment, the control unit detects the interface navigation control input using one or a set of motion sensors that are capable of capturing gestures (e.g., hovering). In yet another embodiment, the control unit detects the interface navigation control input utilizing a combination of above mentioned components. For illustrative purposes, the control unit has been depicted with a touch sensitive surface in the accompanying drawings.

The display unit can be configured to receive the control data sent by the control unit, and update GUI displayed in the display area based on received control data. According to various embodiments, the control unit and the display unit can be configured to communicate with each other via any connection mechanisms, e.g., physical wire or cable, light waves such as IRs, radio waves such as RF, Bluetooth that does not require line of sight, ultrasonic tones, voice control, WiFi, or a combination of such.

The display unit can be configured to receive interface navigation control input data from units other than the control unit. Vice versa, the control unit can be configured to send interface navigation control input data to units other than the display unit. The display unit and the control unit can be devices with or without computing functions. If they are configured with computing functions, the display unit, the control unit or both can carry out computing functions independently or dependently.

Figure 8:
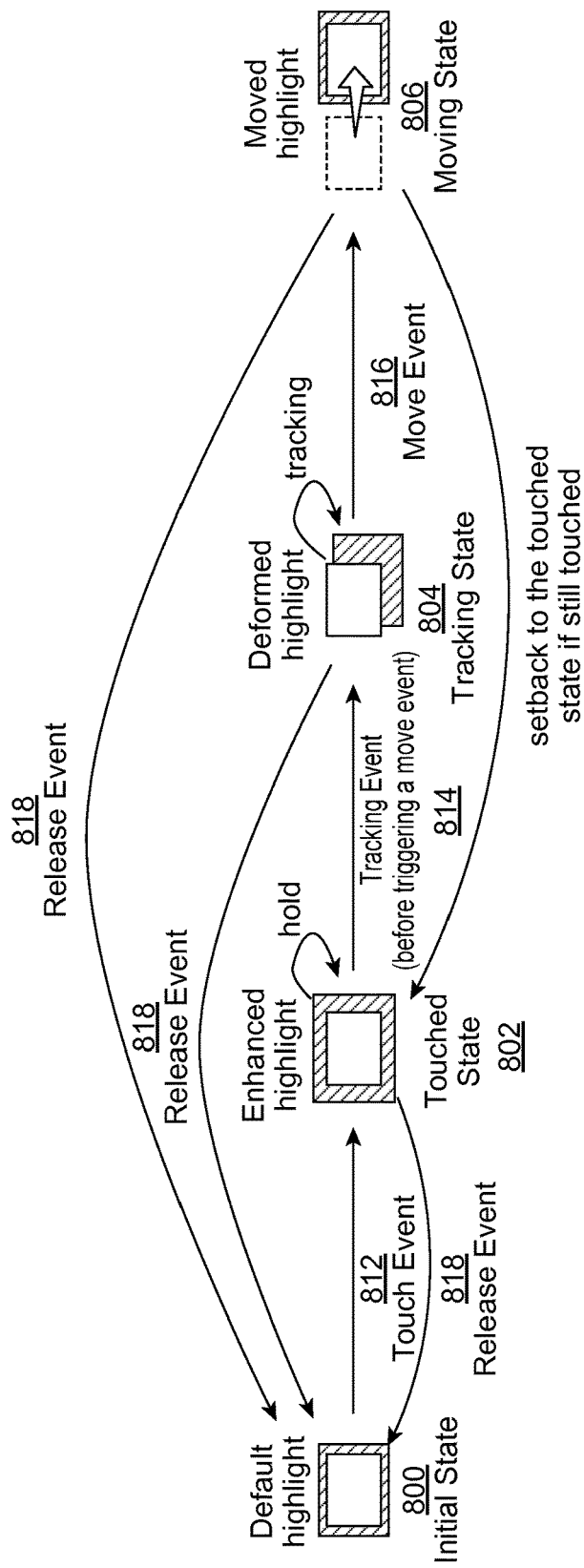
FIG. 8 illustrates an example of state transitions and event types of the interface navigation system.

In one embodiment, the control data transmitted from the control unit to the display unit vary based on the specific state and event triggered by the interface navigation control input. FIG. 8 illustrates the states and events, and how one state transits to the next state by going through specific event. Initial State 800 is a state that no interface navigation control input is detected by the control unit. When a user presses the touch sensitive surface of the control unit, the state transfers to Touched State 802 and Touch Event 812 is communicated. Such press may be caused by the user placing her finger on the touch sensitive surface. Touched State 802 may also be triggered by placement of a stylus, a pen, or any device that is capable of causing an effect similar to a finger touch on the touch sensitive surface. Touched State 802 may further be triggered by placement of multiple fingers on the touch sensitive surface. For illustrative purposes, the rest of the description focuses on the interface navigation control input entered by the user finger movement.

At Touched State 802, if the user drags her finger on the touch sensitive surface of the control unit, the state changes to Tracking State 804 and Tracking Event 814 is communicated. If the user holds her finger on the touch sensitive surface at Touched State 802, the state will be maintained. If the user releases the press, Release Event 818 will be communicated and the state will go back to Initial State 800.

At Tracking State 804, if the user continues dragging her finger until it has travelled a certain distance that reaches a threshold value, the state changes to Moving State 806 and Move Event 816 is communicated. If the user holds her finger on the touch sensitive surface, the state will stay at Tracking State 804. If the user lifts up her finger from the touch sensitive surface, Release Event 818 will be communicated and the state will go back to Initial State 800.

At Moving State 806, if the user maintains her finger pressed on the touch sensitive surface, the state moves to Touched State 802. If the user lifts up her finger from the touch sensitive surface, Release Event 818 will be communicated and the state will go back to Initial State 800.

FIG. 1A shows, at a time $t_0$, Initial State 800, GUI Object 110b is highlighted with a default glowing visual effect 120, which embraces GUI Object 110b. The color of the visual effect 120 may differ from GUI Object 110b so that the visual effect 120 is identifiable. FIG. 1A shows one embodiment that the visual effect 120 enfolds GUI Object 110b. According to various embodiments, numerous visual effects may be implemented to present the visual effect 120 as long as the visual effect 120 provides a clear user cue specifying the default selected GUI object. The visual effect 120 may assume various shapes (e.g., circle, cube, star, tear drop, cross, the same shape as the selected GUI object, etc.), different sizes (e.g., the same as the selected GUI object, bigger than the selected GUI object, or smaller than the selected GUI object, etc.), a number of associations with the selected GUI object (e.g., encompasses the selected GUI object, encircled by the selected GUI object, partially linked with the selected GUI object, etc.), innumerate colors, and/or any density (e.g., transparent, opaque, solid, plaited, striped, etc.). The characteristics of the visual effect 120 may further take a pre-defined format, an application specific format, an OS unique format, a user configurable format to reflect context of the display unit (e.g., ambient light, background noise, number of viewers presented, etc.), and/or the context of how user interacts with the control unit (e.g., the location of the user, the time zone at which the user resides, the mood of the user, the concentration level of the user, etc.).

The visual effect 120 is to indicate that GUI Object 110b is the default selected GUI object. There is always a GUI object selected by default at Initial State 800. The default selection of a GUI object may be based on a variety of factors. In one embodiment, the GUI object associated with the latest GUI operation becomes the default selected GUI object. In another embodiment, the default selected GUI object is one determined by the OS. In yet another embodiment, the default selected GUI object is one defined for the present displayed view. In yet another embodiment, the default selected GUI object is one determined by the activated application. In yet another embodiment, the default selected GUI object is randomly determined. In yet another embodiment, the default selected GUI object is configured by the user.

Figure 1B:
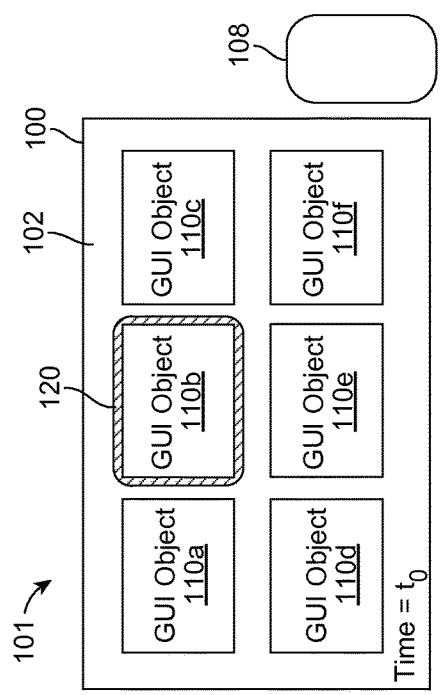

FIG. 1B shows that at a time $t_1$, GUI Object 110b is highlighted with an enlarged glowing visual effect 130. The enlarged glowing visual effect 130 indicates that an interface navigation control input has been detected when user taps at Position p1 on the touch sensitive surface of the control unit. The precise location of Position p1 on the touch sensitive surface may be irrelevant as to how the visual effect 130 associates with GUI Object 110b. The state transitions from Initial State 800 to Touched State 802, and a Touch Event 812 is communicated from the control unit to the display unit.

The visual effect 130 may be transformed from the visual effect 120 in various manners. FIG. 1B illustrates one embodiment that the visual effect 130 amplifies the visual effect 120. According to various implementations, the visual effect 130 may enlarge the visual effect 120, brighten the visual effect 120, or change the color of the visual effect 130, etc. In another embodiment, the visual effect 130 may take a shape completely different from the visual effect 120. The shape of the visual effect 120 may be also transformed in accordance with the strength of the pressure applied to the touch sensitive surface of the control unit. The visual effect 130 may enlarge its size when the detected pressure is growing. It may update the scale of the shape transformation to reflect the level of input force detected.

In one embodiment, upon entering Touched State 802, the intensity of the visual effect 130 remains constant as long as the state stays unchanged. In another embodiment, the strength or the intensity of the visual effect 130 reflects the strength of the pressure or the force of the user's finger placement on the touch sensitive surface of the control unit. The harder or stronger the user presses her finger, the greater the intensity of the visual effect 130 increases. In yet another embodiment, the intensity of the visual effect 130 increases as the time duration of the user's finger placement on the touch sensitive surface of the control unit increases.

If the user releases her finger from the touch sensitive surface of the control unit at Touched State 802, a Release Event 818 is sent from the control unit to the display unit that the state goes back to Initial State 800. Upon receipt of Release Event 818, the display unit updates the display area by changing the visual effect 130 back to the default visual effect 120, as illustrated in FIG. 1A.

Figure 1C:
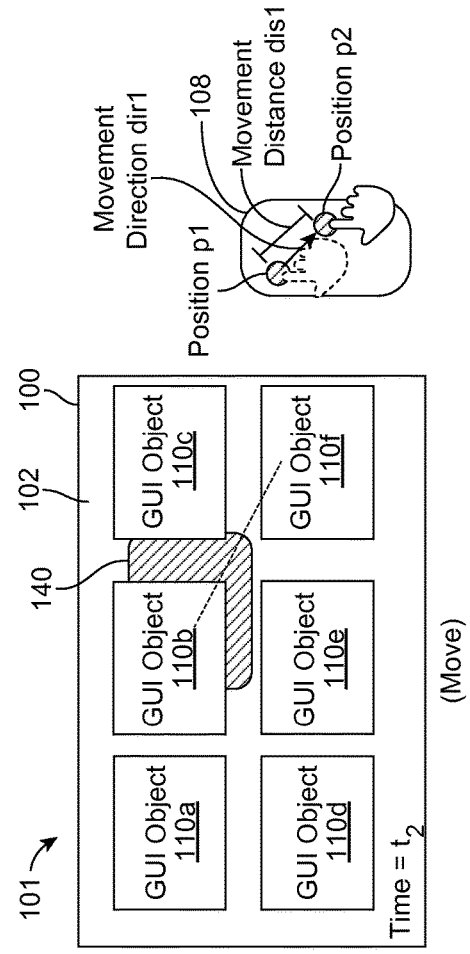

Referring to FIG. 1C, at a time $t_2$, GUI Object 110b is associated with a shifted glowing visual effect 140. The visual effect 140 demonstrates that the user is moving her finger on the touch sensitive surface of the control unit from Position p1 to Position p2 in Movement Direction dir1. Such a user finger movement triggers state update to Tracking State 804 and Tracking Event 814 is communicated from the control unit to the display unit. Such a communication results in a GUI change in the display area of the display unit to indicate that there may be an intention of a GUI object selection transition in a direction parallel to Movement Direction dir1. In one embodiment, the visual effect 140 adopts the same form of the visual effect 130 with its center moving away from GUI Object 110b toward GUI Object 110f, which is parallel to Movement Direction dir1.

In another embodiment, the visual effect 140 is a deformed visual effect 130 demonstrating a force pulling it away from GUI Object 110b toward GUI Object 110f. The overall deformation may provide a hint or indication of the direction of the potential GUI object selection change. The degree of deformation may be updated according to the level of force applied to the touch sensitive surface of the control unit. The visual effect 140 may be transformed into different shapes or colors based on the strength of the force caused by the movement on the touch sensitive surface of the control unit. The transformation degree can be pre-determined by the system, the OS, or the specific application. It can also be configured by each individual user. In one embodiment, the transformation degree may be learnt from the user's finger movement and pressure application patterns observed from the past movement operations or from other types of input operations.

In yet another embodiment, the visual effect 140 takes a form of an animation demonstrating the potential GUI object selection movement from GUI Object 110b to GUI Object 110f. In one embodiment, the animation may reflect the direction of the GUI object selection movement by moving images parallel to Movement Direction dir1. In another embodiment, the animation may present color or intensity gradient according to the GUI object selection movement direction.

In one embodiment, upon entering Tracking State 804, the strength or the intensity of the visual effect 140 remains constant as long as the state remains unchanged. In another embodiment, the strength of the visual effect 140 is updated to reflect the force applied when the user drags her finger to move on the touch sensitive surface of the control unit.

In one embodiment, the visual effects 120, 130 and 140 may be configured by the user. These configuration settings may be entered via a visual effect specification interface. The visual effect specification interface may also present a preview of such configuration settings to demonstrate the real-time effect.

In another embodiment, such visual effect configuration settings can be determined by or dependent of OS, device, and/or application. In yet another embodiment, the combination of visual effects 120, 130 and 140 may create a theme to reflect the context around the GUI object selection change. Such a theme can be in the form of a clock indicating the time, or in the form of a geographic map to indicate the location. In yet another embodiment, the combination of visual effects 120, 130 and 140 may demonstrate the relationship between GUI Object 110b and GUI Object 110f. For example, in a war game application, the visual effects may change the appearance to indicate that the user is going to choose a tougher character.

If the user lifts up her finger from the touch sensitive surface of the control unit in Tracking State 804, Release Event 818 will be generated and communicated from the control unit to the display unit. Upon receipt of Release Event 818, the display unit updates the display area to be back to Initial State 800 by associating GUI Object 110b back with the visual effect 120.

Figure 2:
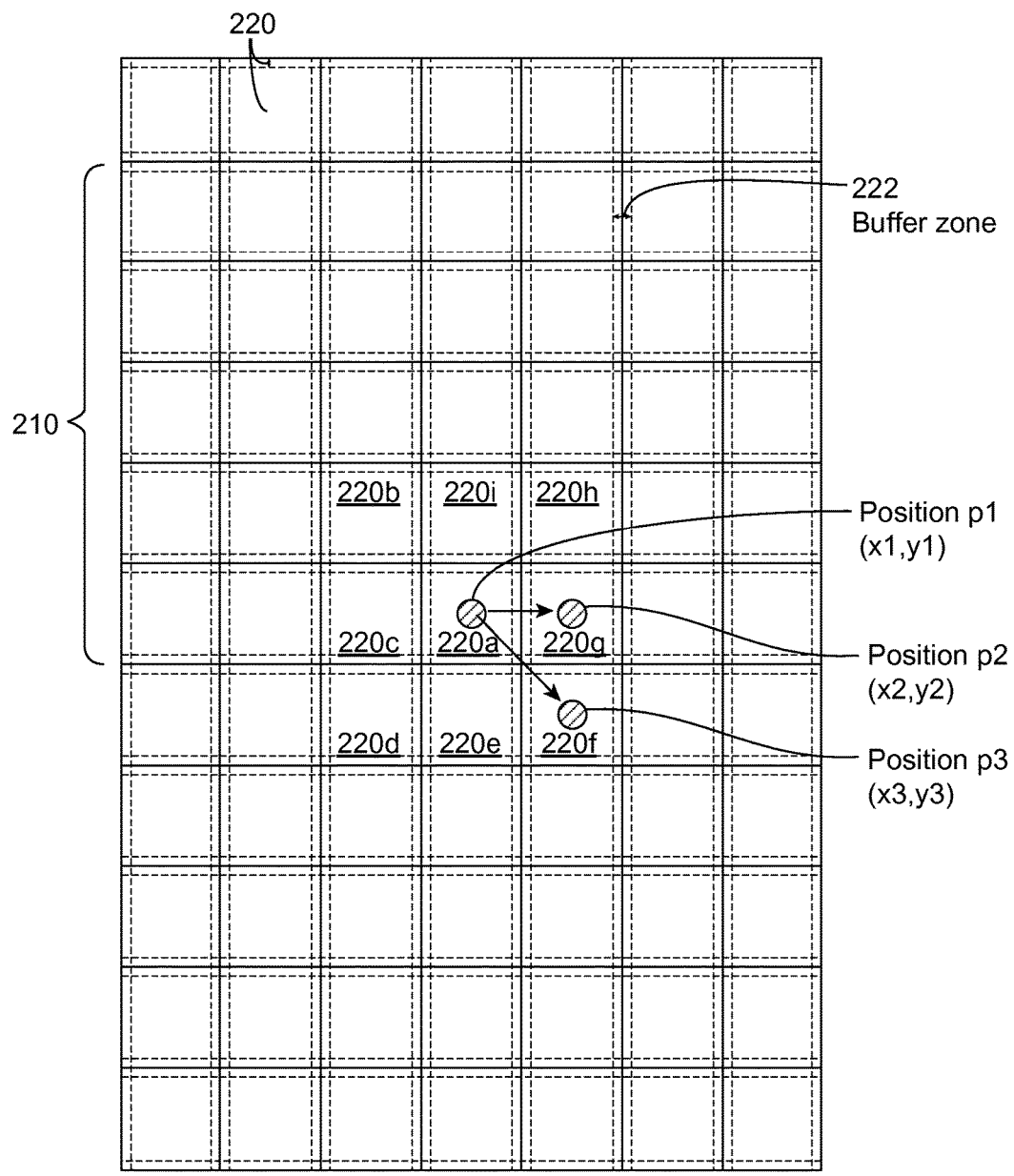
FIG. 2 illustrates an example embodiment of a virtual grid superimposed on the control unit caused by the interface navigation control input.

In one embodiment, when Touched State 802 is triggered at the time $t_1$ as illustrated by FIG. 1E, a virtual grid 210 comprising a series of cells 220 is dynamically formed on the control unit. This virtual grid is depicted in FIG. 2. A Cartesian coordinate system may be used to identify the location of Position p1 as (x1, y1). The parameters of Touch Event 812 may include, but not limited to, the coordinate values (x1, y1) of Position p1. Upon receipt of Touch Event 812, the display unit may update the GUI provided on the display area by rendering GUI Object 110b with the visual effect 130, as illustrated in FIG. 1B.

In one embodiment, cell 220a centers around Position p1 at the formation of the virtual grid 210. As a result, the coordinate values of Position p1 become (0, 0), which represents the origin of the Cartesian coordinate system.

For illustration purpose, FIG. 2 shows that the virtual grid 210 has unified cells 220. It is to be understood, however, that the size of each individual cell 220 of the virtual grid 210 can vary. In one embodiment, such variation depends on the configuration of applications presented on the display area of the display unit.

When a drag movement shown in FIG. 1C is detected at the time $t_2$ by the control unit, the state changes from Touched State 802 to Tracking State 804. At Tracking State 804, the control unit monitors the position of the user's finger placement on the touch sensitive surface of the control unit and updates the coordinate values (x2, y2) of Position p2 accordingly. In one embodiment, Vector v1 that equals to (x2−x1, y2−y1) may be used to represent Movement Direction dir1 from Position p1 to Position p2, as illustrated in FIG. 1C. Parameters of Tracking Event 814, which is communicated from the control unit to the display unit, include, but not limited to, the coordinate values (x2, y2) of Position p2 and Vector v1. Upon receipt of Tracking Event 814, the display unit updates the display area by associating GUI Object 110b with the visual effect 140, which provides an effect that GUI objects selection may move from GUI Object 110b to GUI Object 110f based on the coordinate values (x2, y2) of Position p2 and Vector v1, as illustrated in FIG. 1C.

In one embodiment, the visual effect 140 is shifting away from GUI Object 110b in the same direction on the display area of the display unit as the direction resulted from the user finger movement from Position p1 to Position p2 on the touch sensitive surface of the control unit. This enables a responsive user experience when the interface navigation control input is entered via the control unit that is remote to the display unit.

In one embodiment, the user is able to move her finger in 9 potential directions that may result in movements from cell 220a to 9 possible consecutive targeting cells 220b~220i, as illustrated in FIG. 2. For example, at time $t_3$, when the user drags her finger on the touch sensitive surface of the control unit from Position p1 to Position p3, the effect is a movement from cell 220a to cell 220f. As a result, the state changes from Tracking State 804 to Moving State 806. A Move Event 816 is generated and sent from the control unit to the display unit. Parameters of Move Event 816 include, but not limited to, the relative location of the cell 220f to the cell 220a. Upon receipt of Move Event 816, the display unit will map such a change to the GUI objects displayed on the display area. If there exists a GUI object at a location next to GUI object 110*b* that is corresponding to the position correlation of the cell 220*f* to the cell 220*a*, such a GUI object becomes the selected GUI object. FIG. 1D shows the resulting visual effect. GUI Object 110*f* becomes the selected GUI object as its relative location to GUI Object 110*b* matches the location relationship between the cell 220*a* and the cell 220*f*. Once a change of GUI Object selection takes place, the state goes back to Touched State 802. Accordingly, a glowing visual effect 130' becomes associated with GUI Object 110*f*.

In another embodiment, a system defined, application managed or user configurable sensitivity setting controls the number of virtual cells the user finger movement needs to cross to effectively cause the visual effect indicating a change of GUI object selection from one object to its adjacent neighbor in the same direction as the user finger movement on the touch sensitive surface of the control unit. For example, with a sensitivity setting s1, the visual effect 130/130' may move from GUI Object 110*b* to GUI Object 110*f* when the user finger moves from Position p1 to Position p3 crossing two virtual cells. When the sensitive setting is s2, the visual effect 130/130' may move from GUI Object 110*b* to GUI Object 110*f* after the user finger moves from Position p1 to Position p3 passing five virtual cells.

At time $t_4$, the user lifts up her finger from the touch sensitive surface of the control unit, after her finger has moved to cell 220*f* on the virtual grid 210, a Release Event 818 will be sent from the control unit to the display unit. Upon receipt of Release Event 818, the display unit updates the display area by changing the visual effect associated with the selected GUI object, which is GUI Object 110*f*, from the visual effect 130' to the visual effect 120', which is the same effect as the one at Initial State 800. FIG. 1E demonstrates such a visual effect change.

In one embodiment, as illustrated in FIG. 1F, there is no GUI object available in the display area of the display unit that can be mapped to a location next to GUI Object 110*f* to reflect a similar position correlation of cell 220*f* to cell 220*a*. The visual effect 140, as a result, will remain to be associated with GUI Object 110*f*, disregarding the user finger movement from the cell 220*a* to the cell 220*f*.

In one embodiment, each time the drag movement causes the finger to cross the border of the cells, the virtual grid 210 resets so that Position p2 of FIG. 2 always stays at the center of a cell.

The size of the virtual grid 210 and the size of each individual cell 220 can be tuned to control the sensitivity of visual effect changes to better minor the user finger movement. For example, a virtual grid with bigger sized cells is susceptible to delay the change of GUI object selection while a virtual grid with smaller sized cells tend to change GUI object selection more timely.

The user may become irritated if the visual effect echoing GUI object selection switches back and forth rapidly when the user finger moves across borders of two cells, for example from cell 220*a* to cell 220*b*, backward and forward multiple times. To relieve the user from an overly sensitive GUI reaction, the cells 220*s* may be joined with buffer zones 222*s*, as illustrated in FIG. 2. The size of the buffer zones 222*s* may vary and can be configured. For example, the size of the buffer zones 222*s* can be increased so that the GUI object selection change may be less sensitive to the user finger movements.

In one embodiment, Move Event 816 is only sent, from the control unit to the display unit, after the user finger movement has crossed multiple cell borders. The number of cells may be crossed prior to the state transition from Tracking State 804 to Moving State 806 may be determined by the OS, the application, and/or configured or tuned by the user.

Figure 3A:
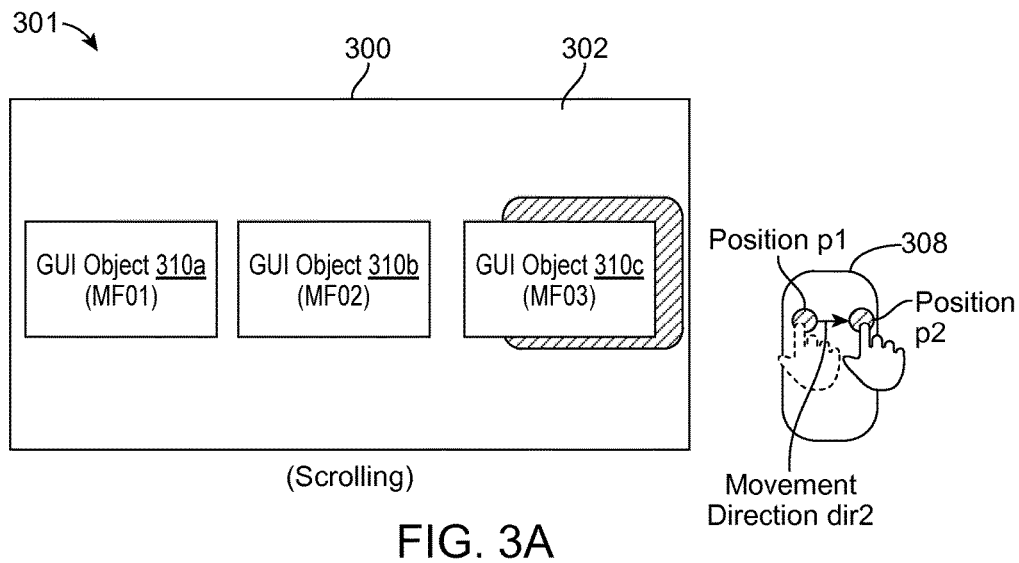
FIGS. 3A-3B illustrate an example embodiment of how the visual effect updates when there is no more GUI objects available in the direction corresponding to the direction of the movement of the interface navigation control input.
Figure 3B:
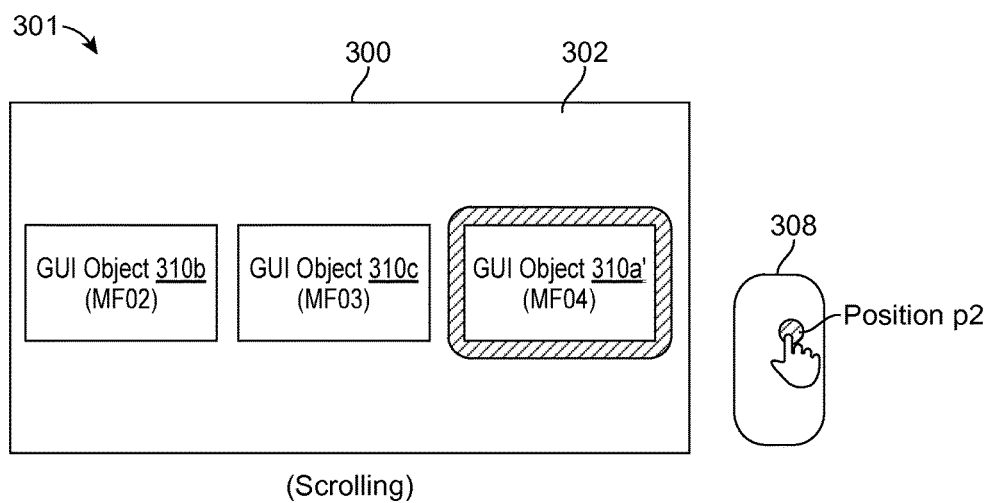

FIG. 3A~3B show another embodiment. In FIG. 3A, the user finger continues to move on the touch sensitive surface of the control unit that effectually results in a cross-over on the virtual grid 210 from cell 220*a* to cell 220*g*. However, there is no additional GUI object available in the display area of the display unit in the direction consistent with such a user finger movement. The GUI can be configured to enable a scrolling feature that the GUI objects from the next available screen get displayed in the display area, as illustrated in FIG. 3B, once the cross-over takes place. FIG. 3B demonstrates that such a scrolling feature provides an effect that GUI Object 310*a* has been moved out of the display area 302, GUI Object 310*b*~310*c* are moved to the left, and GUI Object 310*a*' is moved into the display area 302. For example, a list of all available media files that can be played is presented to the user. The media files are too many that they are formatted to be viewable in multiple screens/pages. At one time, only one screen/page of a certain number of media files is displayed in the display area of the display unit. When the last viewable media file MF03 on the right of the display area 302 is selected and the user finger continues moving to the right, media file MF01 will be moved out of the display area while media file MF04 will be moved into the display area. More media files will be entering the display area from the right side as long as the user continues moving her finger to the right direction until there is no more media file available. At that point, disregarding further user finger movement to the right, there is no more GUI changes.

In another embodiment, there may be a system defined, application managed or user configurable sensitivity setting that controls the number of GUI objects scrolled over based on the distance of the user finger movement. For example, with a sensitivity setting s1, two media files may be scrolled into the display area when the user finger moves for a distance dis1. When the sensitive setting is s2, five media files may be scrolled into the display area for the same user finger movement distance.

Figure 1G:
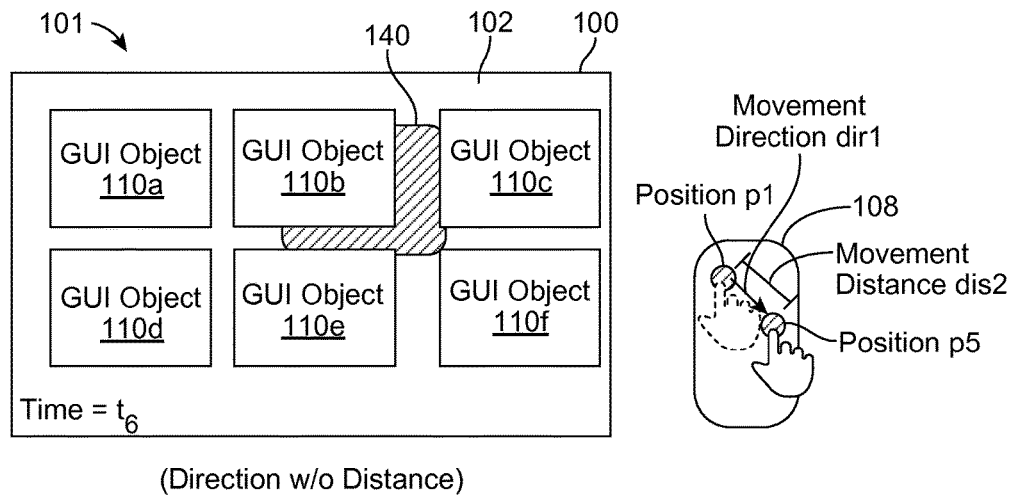
FIGS. 1G-1H illustrate an example embodiment of how the visual effect updates based on the direction and distance of a movement of an interface navigation control input.

As one embodiment, the visual effect 140 in FIG. 1C reflects only the direction of the user finger movement on the touch sensitive surface of the control unit. For example, in FIG. 1C, the user finger drags from Position p1 to Position p2 on Movement Direction dir1 for a Movement Distance dis1. In contrast, in FIG. 1G, the user finger drags from Position p1 to Position p5 on the same Movement Direction dir1 but for a longer Movement Distance dis2. However, there are no discernible visual effect differences between these two user finger movements as long as neither Position p2 nor Position p5 falls into a different virtual cell.

Figure 1H:
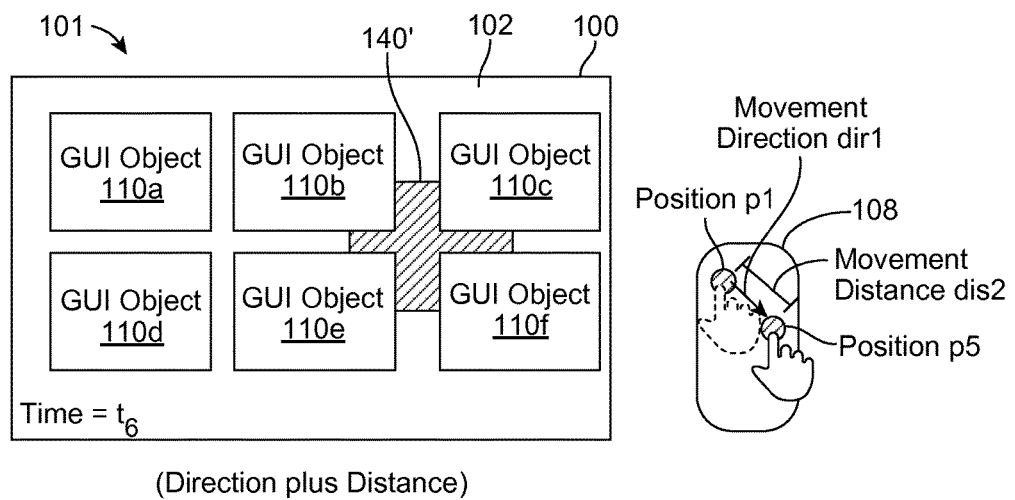

In another embodiment, the visual effect 140 reflects both the direction and the distance of the user finger movement on the touch sensitive surface of the control unit. For example, the visual effect 140' moves further away from the center of GUI Object 110*b* when the user finger continues along Movement Direction dir1 to Position p5, as illustrated in FIG. 1H.

According to some embodiments, the visual effect 140' may shift away from GUI Object 110*b* in a distance proportional to the distance of the user finger movement from Position p1 to Position p5. For instance, if Vector v5 (x5−x1, y5−y1) equals to ¼ of the size of the virtual cell 220*a*, the visual effect 140' moves away from GUI Object 110*b* in a distance corresponding to ¼ of the size of GUI Object 110*b*.

In another embodiment, the visual effect 140' moves away from GUI Object 110b in a distance matching ¼ of an application or OS defined number. In yet another embodiment, the visual effect 140' moves away from GUI Object 110b for ¼ of a user configurable size. In yet another embodiment, the visual effect 140' moves away from GUI Object 110b in a distance representing multiple times of the ¼ of the size of the virtual cell 220a. In yet another embodiment, the visual effect 140' shifts a distance reflecting both the sizes of the starting GUI object and the ending GUI object, and the distance between them.

According to various embodiments, the visual effect at Tracking State 804 can assume various forms and sizes. FIG. 4A shows that, at Initial State 800 at time t0, there is no user input detected by the control unit and GUI Object 410b is the default selected GUI object. In FIG. 4B, at time $t_1$, the user places her finger on the touch sensitive surface of the control unit 408 at Position p1. Correspondingly, a visual effect 430 is associated with GUI object 410b to reflect such a user input. The visual effect 430 comprises two layers. Outer Layer 430a encompasses GUI Object 410b, taking the same shape as GUI Object 410. Inner Layer 430b also takes the same contour as GUI Object 410b, but is enclosed within GUI Object 410b. In FIG. 4C, at time $t_2$, the user moves her finger on the touch sensitive surface of the control unit 408 from Position p1 to Position p2 in Movement Direction dir1 for Movement Distant dis1. A visual effect 440 is displayed reflecting such an interface navigation control input movement. The visual effect 440 still comprises two layers, similar to the visual effect 430. However, while Outer Layer 440a stays in the same form as Outer Layer 430a, Inner Layer 440b is deformed. Inner Layer 440b, taking the same shape as Inner Layer 430b, has the center shifted away in a direction parallel to the user finger Movement Direction dir1. Moreover, the size of Inner Layer 440b reduces proportionally to the distance the user finger moves away from the original touching point Position p1. In FIG. 4D, at time $t_3$, the user fingers move further in the same Movement Direction dir1 to Position p3 resulting in Movement Distance dis2. Accordingly, a visual effect 440' is associated with GUI Object 410b. While the visual effect 440' stays on the track parallel to Movement Direction dir1, the size of its Inner Layer 440b' is smaller than Inner Layer 440b. The size of the inner layer of the visual effect keeps adjusting until the point the user finger movement crosses the border of the originating virtual cell that triggers a GUI object selection change. FIG. 4D further illustrates that both the size and shape of the inner layer of the visual effect change gradually during Tracking State 804. The shape of Inner Layer 440b' transforms from the rounded rectangular shape of Inner Layer 440b to an oval shape. It is to be understood that the inner layer of the visual effect can be transformed to various shapes during Tracking State 804.

It is to be further understood that the visual effect during the Tracking State can adjust its outer layer in similar manners as the changes to the inner layer illustrated in FIG. 4C and FIG. 4D.

In FIG. 1B, the visual effect 130 is a glowing effect that encompasses GUI Object 110b completely, and shifts away from GUI Object 110b during Tracking State 804. In another embodiment, the glowing effect can be enclosed by GUI Object 110b. In FIG. 5A, at time $t_0$, a visual effect 520 is associated with GUI Object 510b in the same manner as illustrated in FIG. 1A. In FIG. 5B, at time $t_1$, the user places her finger on the touch sensitive surface of the control unit 508 at Position p1. As a result, a visual effect 530 is displayed to be associated with GUI Object 510b. The visual effect 530 presents a glowing effect with its concentration of the shade enveloped within GUI Object 510b. While the visual effect 530 may assume various shapes and colors, the concentration of the shade is positioned at the center of the visual effect 530 at Touched State 802. The intensity level reduces radially from the center to the edge of the visual effect 530. In one embodiment, the location of the visual effect 530 and its shade distribution are not affected by the location of the user finger placement at Touched State 802.

In FIG. 5C, at time $t_2$, the user drags her finger on the touch sensitive surface of the control unit 508 from Position p1 to Position p2 in Movement Direction dir1. As a result, a visual effect 540 becomes associated with GUI Object 510b. The visual effect 540 reflects the user finger movement by causing the concentration of the shade to move in the same direction as Movement Direction dir1. When the concentration focal point of the visual effect 540 reaches the corner of GUI Object 510b, the user can tell that a GUI object selection change will take place that GUI Object 510f will become the next selected GUI object.

In another embodiment, a visual effect combining both visual effects 120~140 and visual effects 520~540, as demonstrated in FIGS. 1A~1C and FIGS. 5A~5C, may be applied to guide user to trace an interface navigation control input movement. In FIG. 6A, at time $t_0$, a visual effect 620 is associated with GUI Object 610b. The visual effect 620 is a glowing effect that indicates that GUI Object 610b is the default selected GUI object.

In FIG. 6B, at time $t_1$, the user places her finger on the touch sensitive surface of the control unit 608 at Position p1. In accordance with such a user input, a visual effect 630 is applied to GUI Object 610b to indicate that GUI Object 610b has been selected by the user. In one embodiment, the visual effect 630 is a glowing effect that applies to both inside and outside of GUI Object 610b. The inside shade concentration focal point of the visual effect 630 is positioned at the center of GUI Object 610b. The location of the user finger placement on the touch sensitive surface of the control unit 608 is immaterial.

In FIG. 6C, at time $t_2$, the user drags her finger on the touch sensitive surface of the control unit 608 from Position p1 to Position p2 in Movement Direction dir1 for Movement Distance dis1. Correspondingly, a visual effect 640 is displayed to be associated with GUI Object 610b. The visual effect 640 is transformed from the visual effect 630 in that both the shade concentration inside GUI Object 610b and the outside effect surrounding GUI Object 610b move away from the center of GUI Object 610b, in the same direction as Movement Direction dir1 and proportional to Movement Distance dis1.

In another embodiment, the visual effect at Tracking State 804 may further implement various shapes, sizes and/or intensity based on the speed of the movement of the interface navigation control input. For example, the visual effect may present an overlapped effect of multiple shapes to indicate a faster movement on the touch sensitive surface. The number of overlapped shapes can be based on the multitude of the speed levels, which can be pre-defined by the system, OS, the specific application, and/or configured by the user.

Visual effects at different states can take various shapes, colors and sizes. FIG. 7A~FIG. 7D demonstrate yet another embodiment. In FIG. 7A, at time $t_0$, a visual effect 720 is associated with GUI Object 710b to indicate that GUI Object 710b is the default selected GUI object. In FIG. 7B, at time $t_1$, the user places her finger on the touch sensitive surface of the control unit 708 at Position p1. A visual effect 730 in the shape of a globule is displayed associated with GUI Object 710*b* to indicate such a user input. The form of the visual effect 730 differs from the shape of GUI Object 710*b*. Moreover, the transparent visual effect 730 partially encircles GUI Object 710*b*.

In FIG. 7C, at time $t_2$, a visual effect 740 is associated with GUI Object 710*b* upon detection of the user's finger movement on the touch sensitive surface of the control unit 708 from Position p1 to Position p2 in Movement Direction dir1. The visual effect 740 appears as a deformed visual effect 730 in that the visual effect 740 stretches its overall shape in a direction parallel to Movement Direction dir1 to indicate user's intention to change the GUI object selection from GUI Object 710*b* to GUI Object 710*f*. The shape of the visual effect 740 becomes an elongated globule with the orientation reflecting the direction of such a potential GUI object selection move.

In FIG. 7D, at time $t_3$, as the user continues dragging her finger on the touch sensitive surface of the control unit 708 along Movement Direction dir1 to Position p3, a visual effect 750 is displayed amplifying the further distance travelled by the user's finger movement. The visual effect 750 takes the shape of a similarly distorted globule, with its center shifting away from GUI Object 710*b* towards GUI Object 710*f*, when the direct connection of GUI Object 710*b* and GUI Object 710*f* is parallel to the user finger Movement Direction dir1.

In another embodiment, visual effects at the different states may be implemented to demonstrate a user feedback theme. The user feedback theme may exhibit a migration of seasons, a variation of demographic information, a progression of gaming events, etc. For example, when a user moves her finger on the touch sensitive surface of the control unit causing a GUI object selection change, the visual effects may transition by changing the status of a leaf from spring to summer, autumn and/or winter in accordance with the user finger movement.

For another example, the visual effects may transition from a location on the globe to another in response to the user finger movement. The choice of the starting location may be a random selection, or may be a context-aware selection (e.g., based on the physical location of the user, etc.). The distance traveled between the starting location and the end location, may be proportional to the distance between the initial selected GUI object and the finally selected GUI object. The distance traveled may also be proportional to all GUI objects available that can be displayed on the user interface at the same time, if the display area has unlimited borders.

The user feedback theme can take a system pre-defined format, an application specific format, an OS unique format, or a format configured to reflect context of the display unit and/or context of how the user interacts with the display unit.

Figure 9:
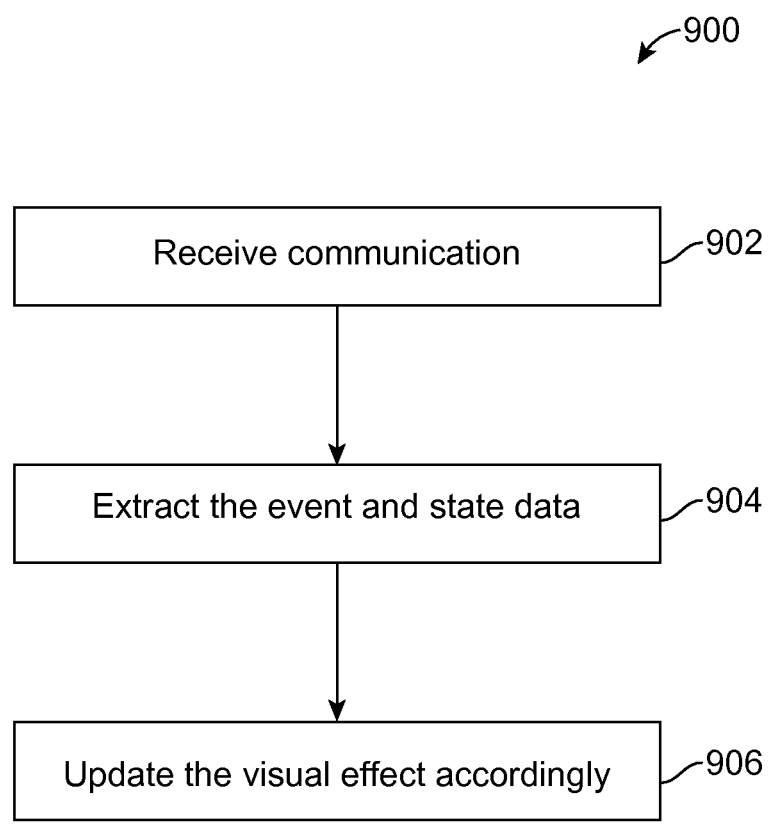
FIG. 9 illustrates an example diagram of a method that causes visual effect updates based on communication received by the display unit.

FIG. 9 shows a flow chart describing the user interface navigation process 900 at the display unit. At step 902, the display unit receives a communication from the control unit. At step 904, the display unit extracts event and state data from the communication data. At step 906, the display unit updates the visual effect to reflect the interface navigation control input movement based on the extracted event and state data.

Figure 10:
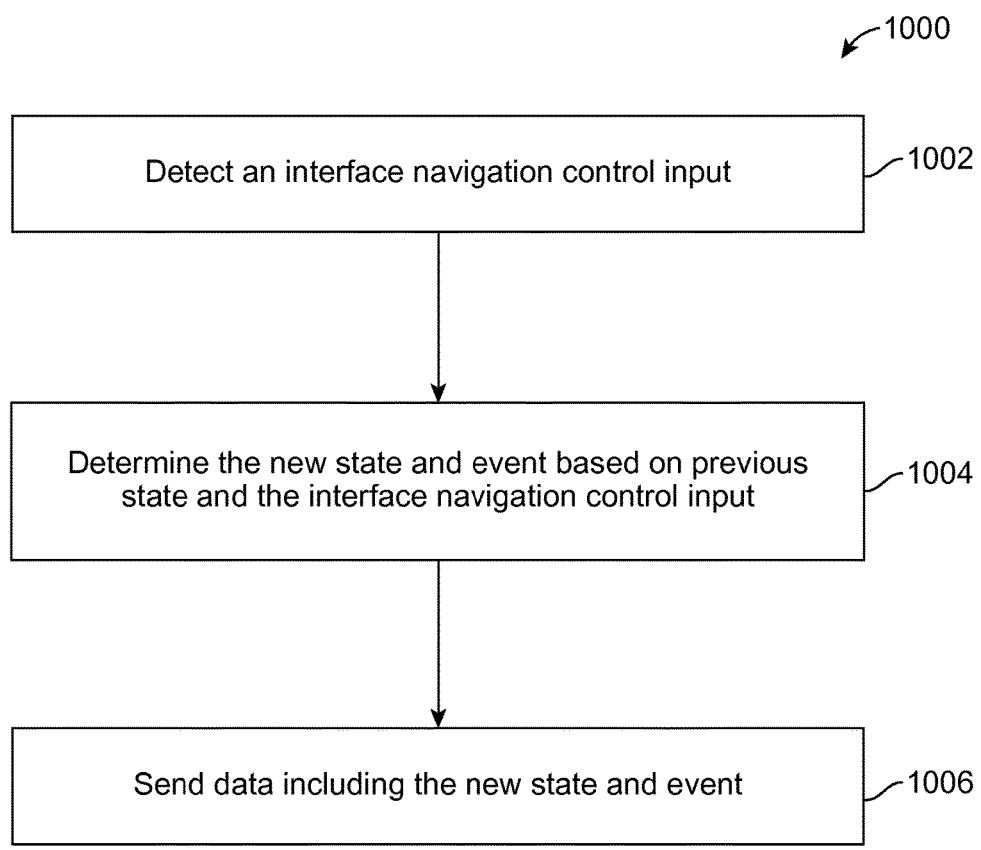
FIG. 10 illustrates an example diagram of a method performed at the control unit to detect the movement of the interface navigation control input, and to communicate such information.

FIG. 10 shows a flow chart describing the interface navigation control input movement process 1000 at the control unit. At step 1002, the control unit detects an interface navigation control input. At step 1004, the control unit determines the new state and event based on previous state and the interface navigation control input. At step 1006, the control unit sends data including the new state and event.

Figure 11:
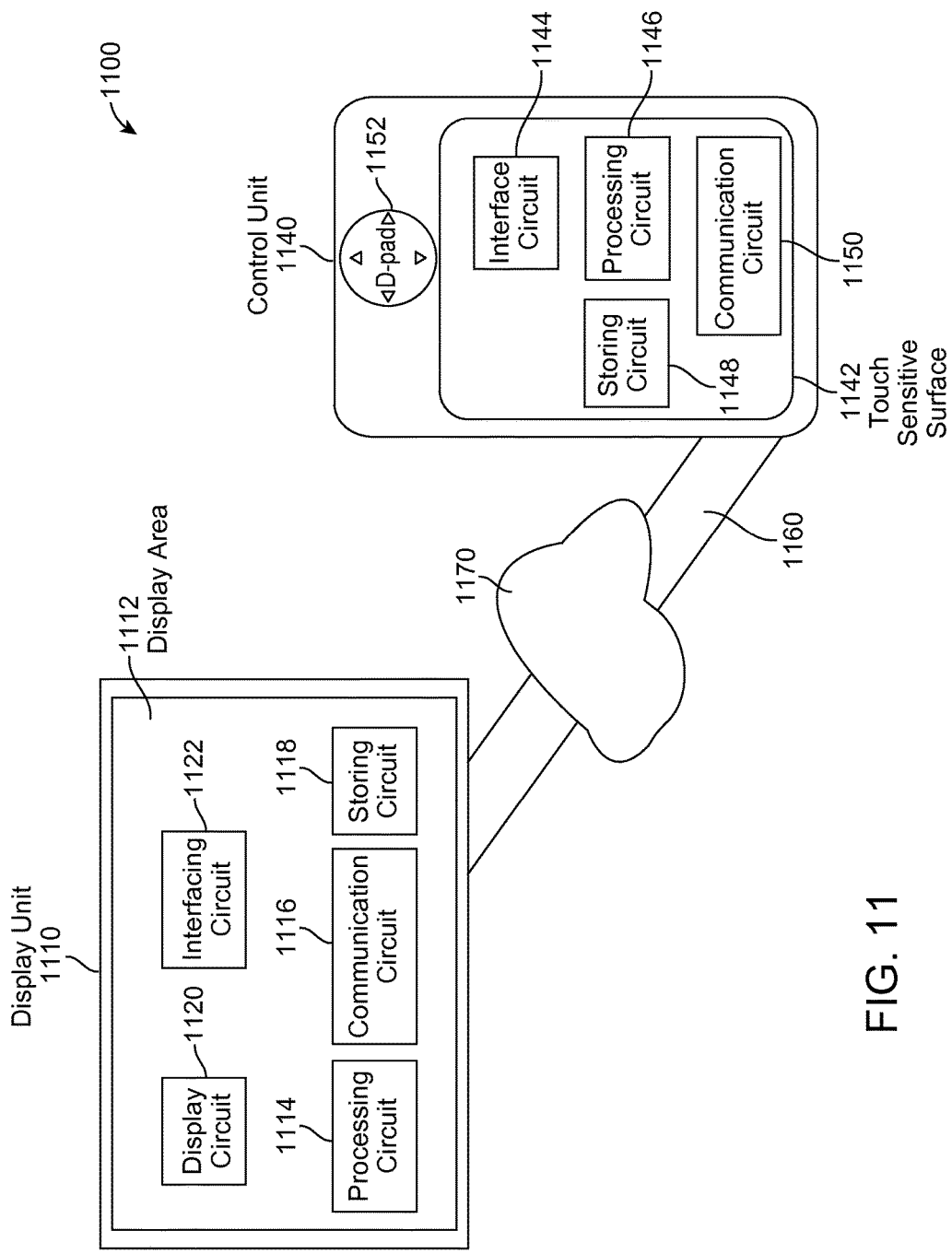
FIG. 11 illustrates an example interface navigation control system comprising a display unit and a control unit.

FIG. 11 is a block diagram of an example system 1100. The system comprises a display unit 1110 and a control unit 1140 for performing the user interface navigation illustrated in FIGS. 1A–1H and FIGS. 3–7.

One embodiment of the control unit 1140 comprises a touch sensitive surface 1142, an interface circuit 1144, a processing circuit 1146, a storing circuit 1148, and a communication circuit 1150. The control unit may include additional touch sensitive surfaces. Optionally, the control unit 1140 may further comprise a button 1152. A movement of an interface navigation control input can be entered into the control unit 1140 via either the touch sensitive surface 1142 or the button 1152. The interface circuit 1144, which is coupled to the touch sensitive surface 1142, may sense and recognize the direction, the distance, the speed, the force, and other factors related to the movement of the interface navigation control input. The movement can be caused by a drag gesture performed on the touch sensitive surface 1142. The interface navigation control input can be caused by various measures, as long as the interface circuit can recognize the factors related to such interface navigation control input movement. The processing circuit 1146 processes the interface navigation control input movement recognized by the interface circuit 1144, and transfers the movement into parameters that include the state and event data illustrated in FIG. 8. Such parameters can further include the previously described coordinate values associated with FIG. 2. Furthermore, the parameters can include information of the speed of the movement of the movement of the interface navigation control input, the force and/or the distance of such movement. The storing circuit 1148 saves these parameters, as well as additional interface navigation control input data. The communication circuit 1148 transmits parameters and data processed by the processing circuit 1146 to other units. In one embodiment, the communication circuit 1148 sends parameters and data via communication path 1160 to the display unit 1110.

The interface circuit 1144, the processing circuit 1146, the storing circuit 1148, and the communication circuit 1150 may also be coupled to the button 1152, and perform the functions described in the above section. Further, these circuits may be integrated into one singular circuit, or be grouped into different circuits, but perform overall similar functions.

For illustrative purposes, the communication path 1160 may be implemented using different protocols, wired or wireless, such as wireless (e.g., Satellite communication, cellular communication, Bluetooth™, Infrared Data Association standard (IrDA), wireless fidelity (WiFi), and worldwide interoperability for microwave access (WiMAX)) communication, wired (e.g., cable, Ethernet) communication, optical, ultrasonic, or the combination thereof. Further, the communication path 1160 can comprises a number of network topologies 1170 and distances. For example, the communication path 1160 can include direct connection, personal area network (PAN), local area network (LAN), metropolitan area network (MAN), wide area network (WAN), or a combination thereof.

The display unit 1110 comprises a display area 1112, a processing circuit 1114, a communication circuit 1116, a storing circuit 1118, and a display circuit 1120. The display area 1112 supports a GUI. The communication circuit 1116 receives, from the communication path 1160, parameters and data associated with the movement of the interface navigation control input, including the state and event data, the speed of the movement, the distance moved, the force applied causing the movement, and/or the coordinate values. The processing circuit 1114, coupled to the communication circuit, processes the received parameters and data to generate corresponding GUI control commands. It extracts, from the parameters and data, information such as the direction, the distance, the speed, the force, and other factors related to the movement of the interface navigation control input. The storing circuit 1118 saves the parameters and data, as well as GUI control commands with the extracted information. The processing circuit 1114 may generate additional GUI control commands based on the saved information, GUI control commands, parameters and/or data and the received parameters and data. For example, state and event may be updated based on previous state and/or event. The display circuit 1120 updates the size, the shape, the color, the intensity, and/or the theme, etc. of the visual effects to reflect the movement of the interface navigation control input based on GUI commands. Optionally, the display unit 1110 comprises an interface circuit 1122, which accepts an interface navigation control input not entered at the control unit 1140.

The processing circuit 1114, the communication circuit 1116, the storing circuit 1118, the display circuit 1120, and the interface circuit may be integrated into one singular circuit, or be grouped into different circuits, but perform overall similar functions.

References throughout this specification to "one embodiment" or "an embodiment" mean that a particular structure, feature, function or characteristic described is included in at least one implementation encompassed within the present invention. Therefore, phrases of "one embodiment" or "an embodiment" are not necessarily referring to the same embodiment. Furthermore, the particular structure, feature, function or characteristic may be instituted in other suitable forms other than the particular embodiment illustrated, and all such forms may be encompassed within the claims of the present application.

What is claimed is:

1. A television (TV) to provide visual feedback on control movements detected by a remote control unit, comprising:
   a display unit of the TV; and
   a processor, coupled to the display unit, configured to control the display unit to display:
      a plurality of graphical user interface (GUI) objects on the display unit of the TV; and
      a visual effect applied to a GUI object selected from among the plurality of GUI objects to represent in part navigational control input from a user, wherein the visual effect comprises two layers including:
         an outer layer that visually encompasses the GUI object along at least a portion of an outer edge of a contour of the GUI object, and
         an inner layer that is visually enclosed within the GUI object and takes a same shape as the GUI object and is along an inner edge of the contour of the GUI object;
   the processor further configured to:
      when there is no user input detected, display the outer layer of the visual effect;
      in response to a user touch detected on the remote control unit, enlarge a size of a portion of the outer layer of the visual effect while the inner layer maintains the same shape as the GUI object; and
      in response to a touch drag detected following the user touch on the remote control unit:
         deform a shape and change a positon of the portion of the outer layer of the visual effect to indicate a direction of the touch drag, and
         change the size of the portion of the outer layer of the visual effect such that the size of the portion of the outer layer becomes smaller as the position of the portion of the outer layer moves closer to a corner of the GUI object while the inner layer maintains the same shape as the GUI object.

2. The device of claim 1, wherein when the portion of the outer layer of the visual effect reaches a corner of the GUI object and a distance of the touch drag is greater than a threshold value, then the outer layer of the visual effect and the inner layer of the visual effect are applied to another one of the plurality of GUI objects.

3. The device of claim 1, wherein
   the outer layer has a glowing effect, and
   the inner layer is shaded darker than the outer layer having the glowing effect.

4. The device of claim 1, wherein in response to the user touch on the remote control unit, the size of the portion of the outer layer of the visual effect is enlarged but a size of the GUI object is not enlarged.

5. The device of claim 1, wherein in response to a release of the user touch from the remote control unit, the size of the portion of the outer layer of the visual effect is no longer enlarged.

6. The device of claim 1, wherein the outer layer of the visual effect visually encompasses the GUI object along the entire outer edge of the contour of the GUI object, and wherein in response to the touch drag following the user touch on the remote control unit, the shape of the portion of the outer layer is deformed to indicate the direction of the touch drag while the outer layer of the visual effect visually encompasses the GUI object along the entire outer edge of the contour of the GUI object.

* * * * *